US010623657B2

(12) United States Patent
Hellerud et al.

(10) Patent No.: US 10,623,657 B2
(45) Date of Patent: Apr. 14, 2020

(54) AUDIO ASSISTED AUTO EXPOSURE

(71) Applicant: Cisco Technology, Inc., San Jose, CA (US)

(72) Inventors: Erik Hellerud, Oslo (NO); Frode Tjøntveit, Fjellhamar (NO); Lennart Burenius, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/006,254

(22) Filed: Jun. 12, 2018

(65) Prior Publication Data
US 2019/0379839 A1 Dec. 12, 2019

(51) Int. Cl.
| | |
|---|---|
| *H04N 5/235* | (2006.01) |
| *H04N 5/243* | (2006.01) |
| *G06F 3/16* | (2006.01) |
| *H04N 5/232* | (2006.01) |
| *G01L 17/00* | (2006.01) |
| *H04N 7/15* | (2006.01) |
| *H04M 3/56* | (2006.01) |

(52) U.S. Cl.
CPC ........... *H04N 5/243* (2013.01); *G01L 17/005* (2013.01); *G06F 3/16* (2013.01); *H04N 5/2351* (2013.01); *H04N 5/23219* (2013.01); *H04M 3/567* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 6,593,956 B1* | 7/2003 | Potts | G01S 3/7865 348/14.09 |
| 9,497,412 B1 | 11/2016 | Rosenberg | |
| 9,633,270 B1* | 4/2017 | Tangeland | G06K 9/00228 |
| 9,883,143 B2 | 1/2018 | Tangeland et al. | |
| 2002/0101505 A1* | 8/2002 | Gutta | H04N 7/15 348/14.07 |
| 2007/0153091 A1 | 7/2007 | Watlington et al. | |

(Continued)

OTHER PUBLICATIONS

Song et al., "A Framework for Indexing Personal Videoconference," Idea Group Inc., 2005, pp. 293-320.

*Primary Examiner* — Twyler L Haskins
*Assistant Examiner* — Wesley J Chiu
(74) *Attorney, Agent, or Firm* — Polsinelli PC

(57) ABSTRACT

Systems, methods, and computer-readable media for automatically setting exposure levels in a session based on an active participant. In some embodiments, a method can include detecting faces of one or more participants in one or more images in a captured video feed at a location of the participants illuminated at one or more illumination levels at the location. The one or more detected faces can be associated with brightness levels of the one or more participants based on the one or more illumination levels at the location. Audio input can be received for the one or more participants at the location and a first participant can be identified as an active participant using the audio input. Further, an exposure level of the captured video feed can be set based on the first participant acting as the active participant according to a brightness level in the one or more images associated with a face detection of the first participant in the one or more images.

18 Claims, 8 Drawing Sheets

(56) References Cited

U.S. PATENT DOCUMENTS

| | | | | |
|---|---|---|---|---|
| 2007/0263097 A1* | 11/2007 | Zhao | ............... | H04N 5/2351 |
| | | | | 348/221.1 |
| 2009/0003678 A1* | 1/2009 | Cutler | ............ | G06K 9/00362 |
| | | | | 382/132 |
| 2009/0322915 A1* | 12/2009 | Cutler | ............ | H04N 5/23219 |
| | | | | 348/251 |
| 2014/0049595 A1* | 2/2014 | Feng | .................. | H04N 7/15 |
| | | | | 348/14.08 |
| 2015/0133097 A1* | 5/2015 | Jang | ................ | H04M 3/568 |
| | | | | 455/416 |
| 2016/0134838 A1* | 5/2016 | Tangeland | ......... | H04N 7/142 |
| | | | | 348/14.09 |
| 2019/0215464 A1* | 7/2019 | Kumar | .............. | H04N 7/147 |

\* cited by examiner

AUDIO ASSISTED AUTO EXPOSURE

TECHNICAL FIELD

The present technology pertains to setting an exposure level in a captured video feed, and in particular to setting an exposure level of a captured video feed based on one or more illumination levels at one or more participants who are acting as an active participant.

BACKGROUND

Currently, camera systems are used to capture audio and video of multiple participants at a location. In particular, videoconferencing sessions are used to conduct meetings or otherwise allow people to communicate from different locations. Often times videoconferencing sessions include multiple people who are illuminated differently at the same location in the videoconferencing session. This creates problems when setting exposure levels for capturing a video feed, e.g. in video conferencing sessions. Specifically, current cameras typically use an average brightness across participants in a session to set an exposure level for capturing a video feed in the session. This averaging technique can lead to exposure levels that are incorrect or otherwise leave an active participant over exposed or under exposed in a video feed. Specifically, large differences in illumination levels of different participants in a session can lead to an averaged exposure level that is incorrect for a current active participant. There therefore exist needs for correctly setting an exposure of a video feed of a session for an active participant, e.g. not under or over exposing the active participant, when participants are illuminated differently at a location in the session.

Further, current camera systems use face detections to control automatic exposure of captured video feeds of sessions. Current face detection algorithms identify face detections by applying machine learning or specific feature extraction methods to images or videos captured at a location in a session. This can lead to false detections of faces in a video session. For example, current face detection algorithms can identify a reflection of a participant as an actual face detection. In turn, as face detections are used to control automatic exposure of a captured video feed, falsely identified face detections can distort or otherwise cause setting of incorrect exposures for the capture video feed in a session. For example, an identified face detection of a reflection can include low illumination levels at the reflection that are used to set a reduced exposure level for a captured video feed. This reduced exposure level can be lower than an ideal exposure level for the captured video feed leading to incorrect exposure of an active participant in the video feed. There therefore exist needs for eliminating an impact of false face detections on setting exposure levels of video feeds, e.g. in a videoconferencing session.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
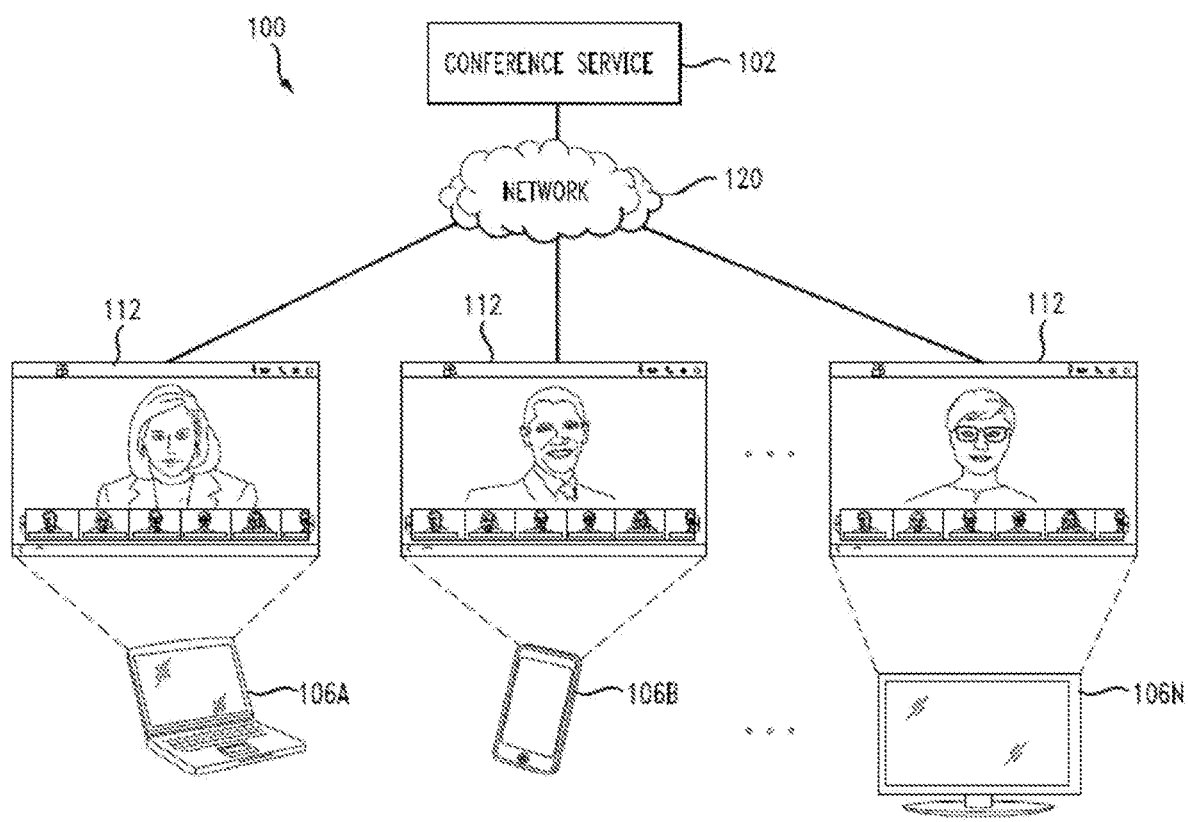
FIG. 1 illustrates a diagram of an example conference environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include detecting one or more faces of one or more participants in one or more images in a captured video feed created by a camera at a location of the one or more participants illuminated at one or more illumination levels at the location. The one or more detected faces in the one or more images can be associated with one or more brightness levels of the one or more participants in the one or more images caused by the one or more illumination levels at the location. Audio input from the one or more participants at the location can be received and a first participant can be identified as an active participant using the audio input. Further, the method can include setting an exposure level of the captured video feed of the one or more participants at the location based on the first participant acting as the active participant according to a brightness level in the one or more images associated with a face detection of the first participant in the one or more images.

A system can capture a video feed at a location. The video feed can include images of one or more participants illuminated at one or more illumination levels at the location. The images can be associated with one or more brightness levels caused by the one or more illumination levels at the location. The system can receive audio input from one or more participants at the location and identify a first participant of the one or more participants as the active participant using the audio input. Further, the system can set an exposure level of the captured video feed of the one or more participants at the location based on the first participant acting as the active participant according to a brightness level in the one or more images associated with a face detection of the first participant in the one or more images.

A system can identify one or more face detections of one or more participants in one or more images in a captured video feed created by a camera at a location of the one or more participants illuminated at one or more illumination levels at the location. The one or more face detections in the one or more images can be associated with one or more brightness levels of the one or more participants in the one or more images caused by the one or more illumination levels at the location. Audio input from the one or more participants at the location can be received and a first participant can be identified as an active participant using the audio input. Further, the system can gradually adjust an exposure level of the captured video feed of the one or more participants at the location over time based on the first participant acting as the active participant according to a brightness level in the one or more images associated with a face detection of the first participant in the one or more images.

Description

The disclosed technology addresses the need in the art for improved automatic exposure level setting. The present technology involves system, methods, and computer-readable media for automatically setting an exposure level in a captured video feed of a session based on a participant who is acting as an active participant in the session.

Figure 2:
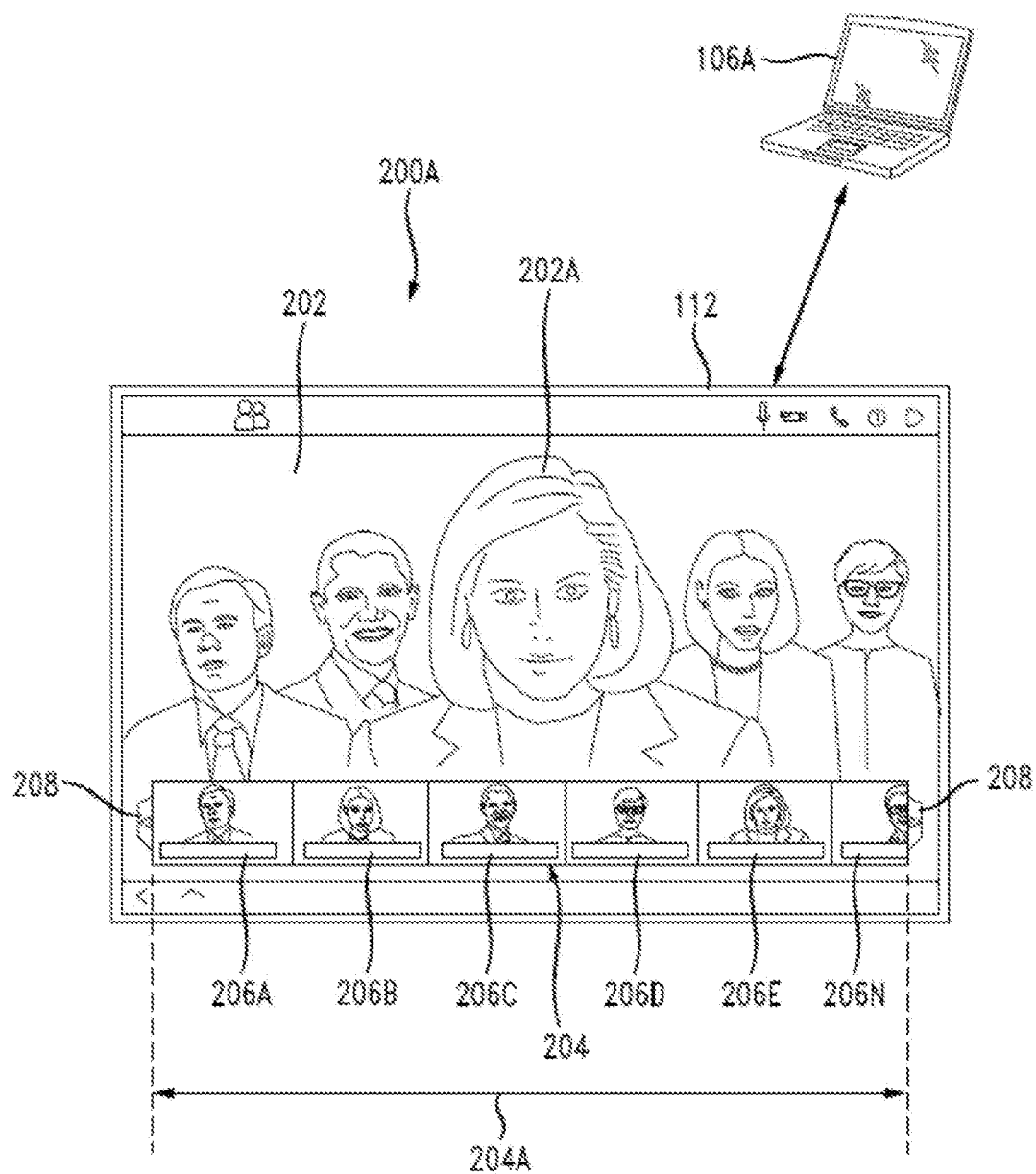
FIG. 2 illustrates an example view of a conference showing an active participant and a panel of participants.
Figure 7:
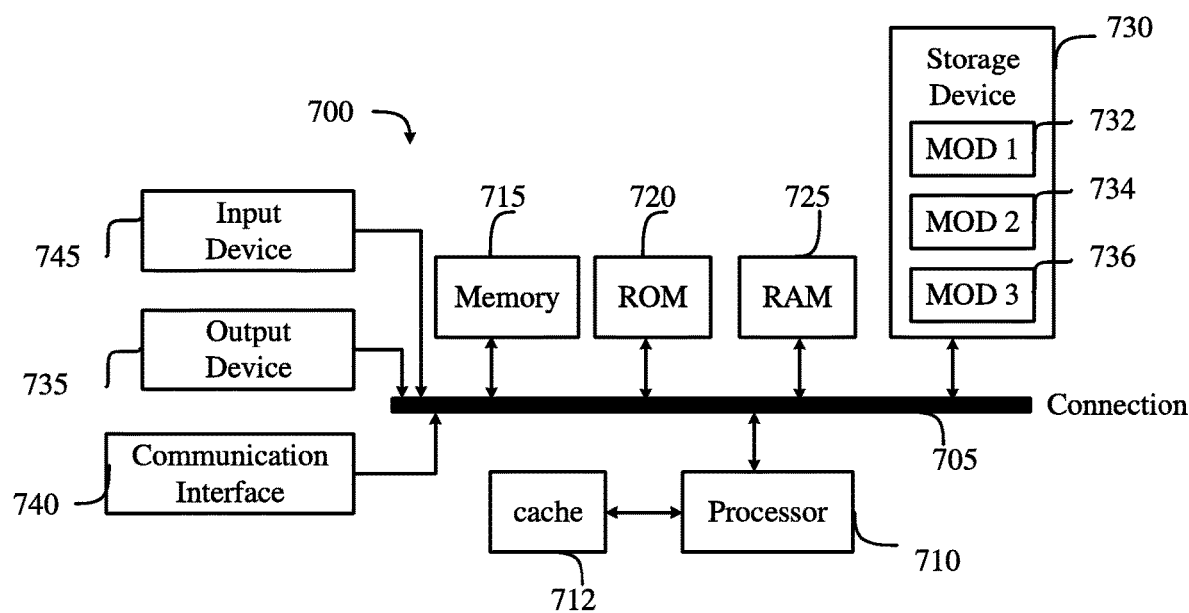
FIG. 7 illustrates an example computing system.
Figure 8:
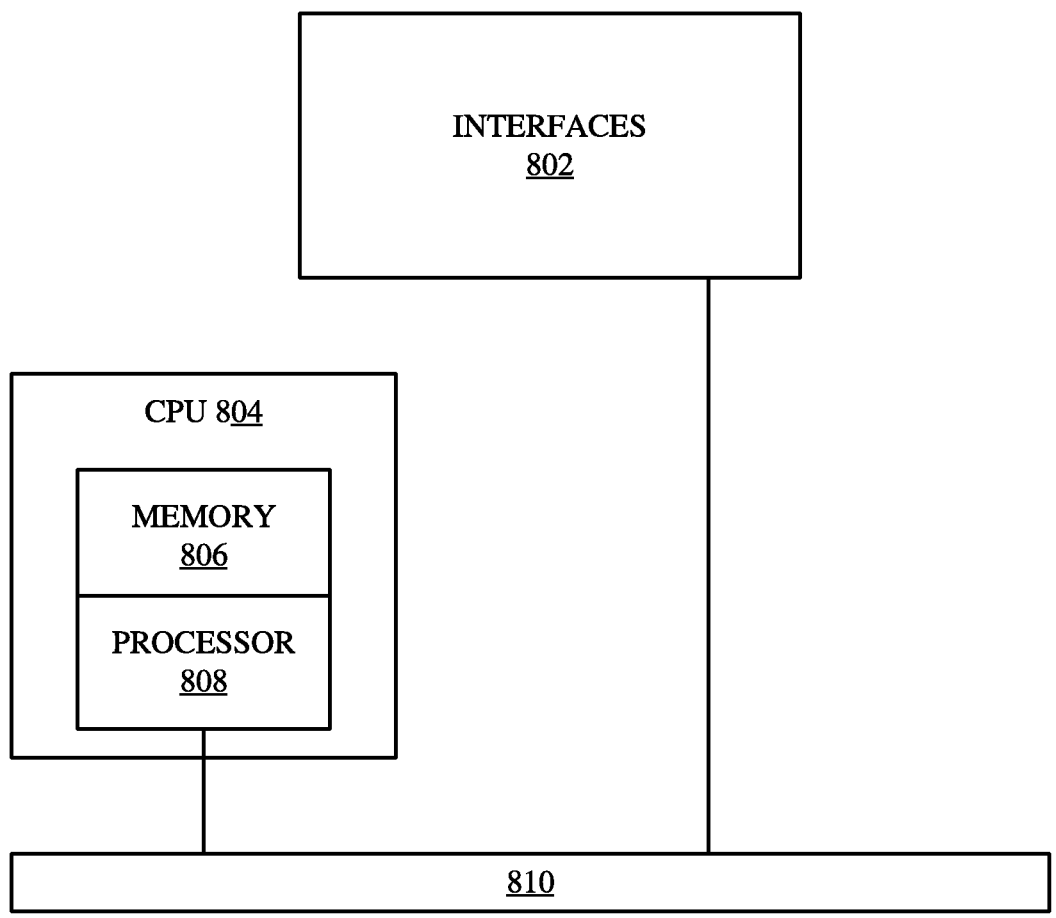
FIG. 8 illustrates an example network device.

A description of conference environments and views of a conference environment, as illustrated in FIGS. 1 and 2, is first disclosed herein. A discussion of systems and methods for setting exposure levels based on an active participant, as shown in FIGS. 3-6. The discussion then concludes with a brief description of example devices, as illustrated in FIGS. 7 and 8. These variations shall be described herein as the various embodiments are set forth. The disclosure now turns to FIG. 1.

FIG. 1 illustrates a diagram of an example conference environment 100. The conference environment 100 can include a conference service 102 configured to host conferences between participants connected via respective endpoints 106A, 106B, 106N (collectively "106" hereinafter). The conferences can include web conferences, video conference, telepresence, and any other type of electronic communication session. A conference can include video, voice, voice messaging, content sharing, instant messaging, desktop or screen sharing, chat, presence sharing, and/or other types of media and communications. Moreover, a conference can include real-time or live and/or recorded content and communications.

Conferences can be hosted and managed by the conference service 102. The conference service 102 can manage various aspects of the conferences, such as content, communications, data, state, settings, functionality, routing, bridging, etc. The conference service 102 can host concurrent conferences, persistent conferences, and other so forth. The conference service 102 can host numerous conferences at any time or period (e.g., an hour, a day, a week, a month, etc.). The number and/or type of participants in a conference can vary and may change dynamically. For example, the number of participants in a conference can change during the conference, as participants may dynamically join or leave the conference.

The conference service 102 can include one or more servers, bridges, server applications, cloud services, routers, conference bridges, gateways, multipoint control units, conference applications, etc. Moreover, the infrastructure of the conference service 102 can vary in different deployments. For example, the conference service 102 can be deployed via an on-premises conferencing infrastructure for an organization or enterprise, as a cloud-based service hosted on one or more cloud computing environments or data centers, in a hybrid infrastructure including an on-premises conferencing infrastructure and cloud-based service, etc. In some cases, the conference service 102 can be a cloud-based conferencing service or infrastructure.

The conference service 102 can host different conferences with respective participants connecting from endpoints in different geographic locations, networks, etc. Participants can join and interact with a conference hosted at the conference service 102 from their respective endpoints 106. The endpoints 106 can communicate with the conference service 102 via a network 120, in order to join and participate in a conference hosted by the conference service 102. The network 120 can include one or more public networks, such as the Internet; one or more private networks, such as a local area network; a combination of public and private networks; etc. The endpoints 106 can include any computing device with networking and conferencing capabilities, such as a smartphone, a tablet computer, a mobile media device, a gaming system, a smart television, a laptop computer, a conference phone or client, or any other smart or computing device.

The conference service 102 can support different conferencing clients and technologies. For example, the conference service 102 can support SIP clients, H.323 videoconferencing endpoints, WebEx video participants, WebEx audio-only participants, VoIP clients, PSTN clients, etc. The endpoints 106 can run specific software which enables users to participate in a conference on the conference service 102. For example, participants can use a conferencing application 112 at the endpoints 106 to join and participate in a conference on the conference service 102. The conferencing application 112 can function as a conference client at the endpoints 106. The conferencing application 112 can be a native client application configured specifically for conferences hosted by the conference service 102, a web browser application having specific functionalities for web conferencing, a client application that supports one or more conferencing technologies or protocols, or any other software application suitable for conferencing.

The conferencing application 112 can include various tools and capabilities, including software and/or hardware, for conferencing, such as network capabilities, video capabilities, audio capabilities, compression capabilities, NAT/Firewall traversal capabilities, one or more codecs, and so forth. Non-limiting examples of technologies that can be used by conferencing application 112 to participate, create or establish, manage, or otherwise support a conference hosted on the conference service 102 include SIP, H.263, H.264, H.264 High-Profile, H.264 SVC (SSL VPN client), H.239, H.320, H.323 SIP, VoIP, G.711, G.722, G.729, T.120, VP8, RTP, TCP/IP, HD video conferencing, remote frame buffer protocol, real-time protocol, and so forth.

The conferencing applications 112 can run on endpoints 106, and interact or interface with hardware and/or software components on the endpoints 106. For example, the conferencing applications 112 can interact with various hardware components, including input and/or output devices, such as a display, a camera, a microphone, a speaker, a peripheral device, a sensor, etc.; storage devices, such as memory, hard drives, flash drives, logical or physical disks, solid state drives, etc.; processing devices, such as microprocessors; and so forth. The conferencing applications 112 can also interact with other software applications and components on the endpoints 106, such as web browsers, chat or messaging clients, files, email clients, address books, calendars, notification systems, operating systems, etc.

Such interactions can be used by the conferencing applications 112 to support and/or augment conferencing communications and functionalities. For example, the conferencing applications 112 can communicate with a screen or display at the endpoints 106 to display a conference and present data received from conference service 102 and/or other endpoints. As another example, the conferencing applications 112 can communicate or interface with input devices, such as a camera and a microphone, to capture video and/or audio at the endpoints 106 for the conference. The conferencing applications 112 can pass the captured data to a network interface in order to send the data to the conference service 102 for the conference.

The conferencing applications 112 can provide a graphical user interface for the conference at the endpoints 106, such as a graphical conference interface. The graphical user interface can provide a presentation of a conference, which can include, for example, conference video, audio, content, communications, participants, presence information, tools, media feeds, and so forth. For example, the conferencing applications 112 can provide a graphical conference interface that presents a visual representation of a conference, as well as any tools or objects associated with the conference. In some cases, the graphical conference interface can be configured as a collaboration room which provides a virtual experience similar to an in-person conference in a conference room.

The graphical conference interface can present video and/or image feeds from participants in the conference which can enable participants to see each other in real time, for example. The graphical conference interface can present activity and interactions occurring in the conference (e.g., chat, messaging, and other communications), presence information, conference controls, collaboration tools and controls, etc. Non-limiting examples of graphical conference interfaces are further described below.

The conferencing applications 112 can modify or update a graphical conference interface based on conference activity, such as speech, presentation activity, motion, etc. The endpoints 106 and/or conference service 102 can be equipped with one or more sensors or devices for detecting such activity. The detected activity can be configured to trigger changes in the graphical conference interface, such as updates to which participant is displayed as an active participant, as further explained below. Non-limiting examples of sensors or devices for detecting activity can include a camera, a microphone, a motion sensor, a speed sensor, a position sensor, a light sensor, a heat or temperature sensor, a touch sensor, an image sensor, a video sensor, a voice sensor, a biometric sensor, etc. Such sensors or devices can not only be used to detect certain activity but also detect noise or reduce false positive detections of activity. For example, one or more microphones, cameras, sensors, and/or detection systems can be implemented to distinguish speech from background noise.

As discussed above, the conference environment 100 in FIG. 1 is hosted by a conference service 102. This architecture is provided as a non-limiting example for the sake of clarity and explanation purposes. However, the concepts disclosed herein apply to other conference environments and architectures. For example, the concepts disclosed herein can apply to other architectures, such as peer-to-peer conferencing architectures or WebRTC, which may or may not include the conference service 102.

FIG. 2 illustrates an example view 200A of a conference showing an active participant 202A and a panel 204 of participants. This example view 200A illustrates a presentation at the endpoint 106 of a conference hosted by the conference service 102. The view 200A is presented by the conferencing application 112 at the endpoint 106A, to allow a user or participant at the endpoint 106A to view and participate in the conference from the endpoint 106A. The view 200A in this example can be specific to, or tailored for, endpoint 106A and/or the participant at endpoint 106A.

The conference view 200A can include a display region 202, which can be the main or primary display of the conference. The display region 202 can display an active participant 202A of a plurality of participants at the conference location. The active participant 202A can refer to a specific participant that is determined to be currently of significance in the conference, such as a participant that is currently a main participant, an active participant, or a participant of interest. A participant can be designated as the active participant 202A based on conference activity, conference preferences, participant roles, etc. For example, the active participant 202A can be a current speaker, a moderator, a host, a speaker in a queue, a software agent or participant (e.g., a bot), a targeted participant, etc.

In some examples, a participant is designated as the active participant 202A based on current activity. Current activity can include, for example, current speech, current gestures, current movement, current input, etc. To illustrate, the active participant 202A can be the current speaker in the conference.

The participant designated as the active participant 202A can change dynamically. For example, the active participant 202A can dynamically change based on conference activity. To illustrate, speaker A can be the active participant 202A while speaker A is actively speaking, and speaker B can replace speaker A as the active participant 202A when speaker B becomes the active participant. In this example, speaker A can be displayed in the display region 202 as the active participant 202A until speaker B becomes the active participant, at which point speaker A will be replaced by speaker B in display region 202. As the active participant changes, the active participant 202A displayed in the display region 202 can also change.

The conference view 200A can display a panel 204 of participants in the conference. The panel 204 can include participant representations 206A-N (collectively "206" hereinafter) of respective participants in the conference. A participant representation can include, without limitation, video, camera, image, live, and/or recorded feeds, streams, files, etc. The participant representations 206 can be provided as, or within, thumbnails, windows, tabs, frames, visual elements, interface objects, channels, files, display regions, and so forth. For example, the participant representations 206 in panel 204 and the participant representation associated with the active participant 202A can include respective video captured at the endpoints 106 in the conference.

The participant representations 206 and the participant representation of active participant 202A can allow the conference view 200A to display a live or recorded image or video of the conference participants, to allow participants to see each other. For example, the participant representations 206 and active participant 202A can provide a participant at endpoint 106A a virtual representation of the participants in the conference. The participant at endpoint 106A would be able to view the active participant 202A and participant representations 206 from endpoint 106A and obtain a virtual experience similar the experience in an in-person conference where all participants are physically present in the same conference room.

While the participant representations 206 and the participant representation of the active participant 202A are shown to only include one participant, in various embodiments, the participant representations 206 can each include multiple participants represented simultaneously in the same video feed. For example, the participant representations 206 can show a view of a conference room with multiple participants sitting at a table and displayed simultaneously in a captured video feed. Further, the participant representations 206 and the participant representation of the active participant 202A can include multiple participants illuminated at different illumination levels. For example, the participant representation of the active participant 202A can include an active participant illuminated greater than other participants in a room of a videoconference. Additionally, the participant representations 206 and the participant representation of the active participant 202A can include false representations of participants in a videoconference. For example, the participant representations 206 can include reflections of participants in a video feed of a videoconference.

Currently, camera systems are used to capture audio and video of multiple participants at a location. In particular, videoconferencing sessions are used to conduct meetings or otherwise allow people to communicate from different locations. Often times video sessions include multiple people who are illuminated differently at the same location in the session. This creates problems when setting automatic exposure level for capturing a video feed, e.g. in a video conferencing sessions. Specifically, current camera systems typically use an average brightness across participants at a location in a conferencing session to set an exposure level for capturing a video feed in the session. This averaging technique can lead to exposure levels that are incorrect or otherwise leave an active participant over exposed or under exposed in a video feed. Specifically, large differences in illumination levels of different participants in a session can lead to an averaged exposure level that is incorrect for a current active participant. There therefore exist needs for correctly setting an exposure of a video feed of a session for an active participant, e.g. not under or over exposing the active participant, when participants are illuminated differently at a location in the session.

Further, current camera systems use face detections of participants to control automatic exposure of captured video feeds of sessions. Current face detection algorithms identify face detections by applying machine learning or specific feature extraction methods to images or videos at a location in a session. This can lead to false detections of faces in a session. For example, current face detection algorithms can identify a reflection of a participant as an actual face detection. In turn, as face detections are used to control automatic exposure of a captured video feed, falsely identified face detections can distort or otherwise cause setting of incorrect exposures for the capture video feed in a session. There therefore exist needs for eliminating an impact of falsely identified face detections on setting exposure levels of video feeds of a session.

The present utilizes an identification of a participant who is acting as an active participant as a basis for setting an exposure level for a captured video feed. Specifically, a brightness level associated with a face detection of the participant in one or more images of the captured video feed can be used to set the exposure level for the captured video feed. Subsequently, if another participant takes over acting as the active participant, then a brightness level associated with a face detection of the another participant in one or more images of the captured video feed can be used as the basis for adjusting the exposure level of the captured video feed. This can help to ensure that an active participant is correctly exposed in a captured video feed when participants are illuminated differently at the same location.

Further, the present can timestamp identified brightness levels associated with face detections in images of a captured video feed and positions of participants acting as an active participant. The brightness levels associated with the face detections in the images and the positions of the participants acting as the active participant can be correlated based on the timestamps. Subsequently, the correlated data, e.g. the brightness levels correlated with the specific positions, can be used to set an exposure level for a captured video feed. For example, if a first participant occupies a specific space and is detected as acting as an active participant, then exposure can be set using a brightness levels associated with a face detection of the first participant in an image that is correlated with the specific space. This can further help to ensure that an active participant is correctly exposed in a captured video feed when participants are illuminated differently at the same location.

Additionally, by basing exposure in a captured video feed using known positions of active participants, chances of using falsely identified face detections to automatically set the exposure in the captured video feed are reduced. Specifically, a face detected in an image of a captured video feed can actually be a reflection of a participant that is not at an actual active participant position. Therefore, as brightness levels associated with faces detected at only known active participant positions are used to set the exposure level, a brightness level associated with the reflection of the participant, e.g. the falsely identified face detection, is not used to set the exposure level. This can help to ensure that an active participant is correctly exposed in a captured video feed of a session even when false face detections are generated/identified.

Figure 3:
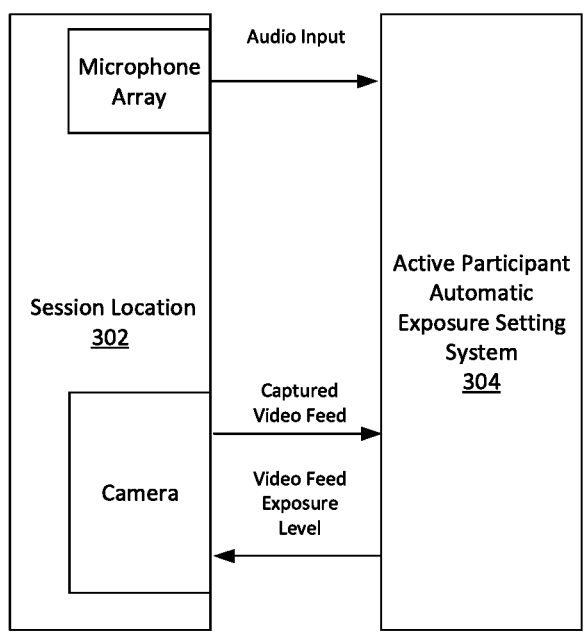
FIG. 3 illustrates an environment for automatically setting an exposure level of a captured video feed based on an active participant.

FIG. 3 illustrates an environment 300 for automatically setting an exposure level of a captured video feed based on an active participant in the session. The environment 300 shown in FIG. 3 includes a session location 302 and an active participant automatic exposure setting system 304. A session can include a simple setting where one or more participants are simply interacting with a camera and a microphone array. Further, a session can include a videoconferencing session where participants are communicating through a camera and a microphone as part of a videoconferencing session. While only a single session location 302 is shown in FIG. 3, in various embodiments the environment 300 can include multiple session locations. For example, the environment 300 can include a first room located in a first building and a second room location in a second building that are connected or otherwise include participants communicating with each other as part of a videoconference session.

Different session locations in the environment 300 can have their corresponding video feed exposure levels controlled. More specifically, an exposure level of a video feed captured at a first location in the environment 300 can be set independent from an exposure level of a video feed captured at another location in the environment 300. For example, an exposure level of a captured video feed of a first room in a videoconference session can be set based on an active participant in the first room, while an exposure level of a captured video feed of a second room in the videoconference session can be set based on an active participant in the second room.

The session location 302 is a location at which people can participate in a session. The session location 302 can include applicable systems and equipment for allowing people to participate in a session. More specifically, the session location 302 can include audio and image/video capturing equipment for generating audio input and a captured video feed at the session location 302, e.g. of participants at a videoconference session location. Additionally, the session location 302 can include systems for reproducing audio and video at the session location 302. For example, the session location 302 can include a monitor and speakers for reproducing audio and video captured at another location in a videoconference session to allow people at the session location 302 to participate in the videoconference session.

Further, the session location 302 can include one or more cameras that capture a video feed of an active participant, such as a SpeakerTrack 60® system, a Quad Cam system, and a Spark® Room Kit. Specifically, the session location 302 can include one or more cameras that are used to capture a video feed zoomed in on an active participant according to a position of the active participant at the session location 302. For example, the session location 302 can include a first camera that zooms in and captures a video feed around an active participant at the session location 302 and a second camera that is on standby for finding and capturing a video feed around the next active participant.

Either or both images and video captured at the session location 302 can be used to identify face detections and one or more corresponding brightness levels associated with the face detections in images. Face detections and corresponding brightness levels associated with face detections in images can be identified from images of participants, e.g. at a session location. Specifically, face detections can include coordinates of a participant, e.g. in captured images, and subsequently be used to identify an image or a portion of an image including a detected face of the participant. Further, one or more brightness levels associated with the face detections in the images can be identified based on brightness levels in the images or portions of the images at the detected faces, e.g. at pixels in an image corresponding to coordinates of a participant.

Images used to identify face detections and associated brightness levels of the face detections in the images can include portions of images that capture all or portions of participants' faces and regions surrounding the participants' faces. More specifically, a face can be detected in one or more images from at least a portion of a face of a participant. Subsequently, a brightness level associated with the face detection can be identified from a specific portion of a region surrounding the detected face of the participant in the image. More specifically, a brightness associated with the face detection can be an average brightness across the pixels forming the detected face of the participant Brightness levels associated with a face detection in an image can include one or more brightness levels at a location of a participant caused by illumination of the participant at one or more illumination levels. Further, brightness levels associated with face detections of participants in one or more images can vary across the participants. Specifically, brightness levels included in face detections can vary across participants as the participants are illuminated at different illumination levels. For example, a brightness level of a detected face of a participant underneath a light at the session location 302 can be brighter than a detected face of a participant who is not underneath the light at the session location 302.

Face detections and corresponding brightness levels can be identified using an applicable face detection method for recognizing a face in a still image or frames of a video. For example, one or more face detections and corresponding brightness levels can be recognized in a still image of one or more participants by applying machine learning to identify coordinates in the still image of one or more detected faces of the one or more participants. Further, the identified coordinates can be used to define an area in the image of a face detection, which can subsequently be extracted or otherwise analyzed to identify a corresponding brightness level of the face detection. A face can be recognized in a still image or a frame of a video from all or a portion of the image or frame. For example, a face can be detected in a specific area in frame of a video, and the face can be detected in subsequent frames by scanning only the specific area where the face was previously detected.

The active participant automatic exposure setting system 304 functions to automatically set an exposure level of a captured video feed at the session location 302 based on one or more active participants. More specifically, the active participant automatic exposure setting system 304 can set an exposure level of a captured video feed based on a current active participant, e.g. at the session location 302. The active participant automatic exposure setting system 304 can be included as part of an applicable application or system for supporting a session, such as the conferencing application 112 shown in FIG. 1. Additionally, while the active participant automatic exposure setting system 304 is shown to be conceptually separate from the session location 302, in certain embodiments, the active participant automatic exposure setting system 304 can be implemented at the session location 302, e.g. as part of videoconferencing equipment at the session location.

In the example environment 300 shown in FIG. 3, the active participant automatic exposure setting system 304 can receive audio input and one or more captured video feeds, e.g. from the session location 302. For example, the active participant automatic exposure setting system 304 can receive a captured video feed of participants in a room that is broadcast or transmitted from a camera at the session location 302. In another example, the active participant automatic exposure setting system 304 can receive audio input from a microphone array at the session location 302. While the audio input and the captured video feed are conceptually shown as separate in the environment 300, the audio input can be included as part of the captured video feed. Specifically, the camera and the microphone array can be implemented together at the session location 302 to capture and subsequently generate combined or otherwise synchronized audio and video input.

Additionally, in the example environment 300 shown in FIG. 3, the active participant automatic exposure setting system 304 can provide instructions or data for setting an exposure level in a captured video feed captured, e.g. at the session location 302 by the camera. Specifically, the active participant automatic exposure setting system 304 can provide instructions for dynamically adjusting or changing an exposure level of a video feed captured by the camera as the video feed is captured at the session location 302. Subsequently, an applicable system for capturing the video feed or controlling capture of the video feed, such as the camera, at the session location 302 can adjust the exposure level of the captured video feed based on the instructions provided by the active participant automatic exposure setting system 304.

The active participant automatic exposure setting system 304 can set an exposure level of a captured video feed based on one or more participants identified as an active participant, e.g. in a videoconference session. Specifically, the active participant automatic exposure setting system 304 can set an exposure level of a captured video feed based on one or more brightness levels at one or more active participants in a videoconference session/video feed caused by illumination of the one or more active participants. For example, if an active participant is illuminated by a light source in a videoconference session to one or more illumination levels, then the active participant automatic exposure setting system 304 can adjust an exposure level of a captured video feed to correctly display the active participant at the specific illumination levels.

In using an active participant to control an exposure level of a video feed, the active participant automatic exposure setting system 304 can identify one or more participants acting as an active participant. Subsequently, the active participant automatic exposure setting system 304 can use the one or more identified active participants to set an exposure level of a captured video feed. The active participant automatic exposure setting system 304 can use applicable systems, equipment, and/or detection methods for identifying roles of participants to identify active participants, e.g. in a session. More specifically, the active participant automatic exposure setting system 304 can identify active participants using either or both received audio input and one or more captured video feeds to identify the active participants. For example, the active participant automatic exposure setting system 304 can use audio and corresponding facial movements of a speaker talking in audio input and a captured video feed to identify the speaker as an active participant.

The active participant automatic exposure setting system 304 can identify face detections of participants in a session from a captured video feed. Specifically, the active participant automatic exposure setting system 304 can use computer vision and/or machine learning to detect faces in still images of a captured video feed and subsequently identify the face detections from the captured video feed. Further, the active participant automatic exposure setting system 304 can identify false face detections. False face detections can include all or a portion of one or more images in a video feed that is identified as a face of a participant in a session but is not an actual face of a participant in the session. For example, a false face detection can include a reflection of a participant in a captured video feed. In another example, false face detection can include objects in an image that trigger a face detection, but are not actually a face detection, e.g. leaves of a tree in a captured image. As will be discussed in greater detail later, false face detections can be removed or otherwise substantially not used in setting exposure levels, thereby helping to ensure correct exposure of an active participant in a session.

The active participant automatic exposure setting system 304 can use one or more identified face detections of one or more active participants to set an exposure level in a captured video feed. Specifically, the active participant automatic exposure setting system 304 can set an exposure level based on brightness levels associated with a face detection of an active participant in one or more images of the active participant. For example, the active participant automatic exposure setting system 304 can determine high brightness levels at an active participant from an image used to identify a face detection for the participant and subsequently decrease an exposure level of a captured video feed of the participant. Setting an exposure level of a video feed, e.g. a feed displaying an active participant, based on brightness levels at the active participant helps to ensure the active participant is correctly exposed. This is advantageous over current methods and systems that average brightness levels across different participants to identify exposure levels for an active participant, thereby often leading to incorrect exposure of the active participant in a captured video feed of a session. This is particularly true when participants are illuminated at different levels and average brightness levels across the participants are used to set an exposure level of an active participant.

Further, the active participant automatic exposure setting system 304 can switch to different exposure levels as participants acting as an active participant switch. Specifically, if an active participant switches from a first participant to a second participant, then the active participant automatic exposure setting system 304 can switch an exposure level based on the first participant to an exposure level based on the second participant. This can allow the active participant automatic exposure setting system 304 to set an exposure level based, at least in part, on a participant who is actually acting as a current active participant in a session.

Additionally, the active participant automatic exposure setting system 304 can set an exposure level in a captured video feed based on a combination of active participants using corresponding brightness levels of face detections in one or more images for the active participants. More specifically, the active participant automatic exposure setting system 304 can set an exposure level in a captured video feed based on one or more brightness levels at a current active participant and either or both a specific number of past active participants and a number of past active participants who are still in a videoconferencing session. For example, the active participant automatic exposure setting system 304 can set an exposure level of a video feed based on an average of brightness levels across the current and past five active participants in a videoconferencing session identified based on face detections in images of the participants.

In adjusting an exposure level based on an active participant, the active participant automatic exposure setting system 304 can gradually adjust an exposure level of a captured video feed over time based on one or more active participants. Specifically, the active participant automatic exposure setting system 304 can adjust an exposure over time based on a brightness at a participant currently acting as an active participant and brightness levels at one or more participants that previously acted as an active participants. For example, once a first participant begins acting as an active participant, then the active participant automatic exposure setting system 304 can gradually adjust the exposure level based on one or more brightness levels in an image used to detect a face of the first participant and one or more brightness levels in one or more images used to detect a face of a second participant who acted as a past active participant.

The active participant automatic exposure setting system 304 can use a sliding window buffer to gradually adjust an exposure level based on an active participant. Specifically, the active participant automatic exposure setting system 304 can maintain a sliding window buffer of brightness levels all or portions of images used to detect faces of past and current active participants to gradually adjust an exposure level of a captured video feed. For example, the active participant automatic exposure setting system 304 can include a brightness level in an image associated with a detected face of a current active participant in a sliding window buffer and remove a final brightness level in the sliding window buffer to modify the sliding window buffer. Further in the example, the active participant automatic exposure setting system 304 can use the sliding window buffer, e.g. average brightness levels in images across detected faces in the sliding window buffer, to gradually change an exposure level based on the current active participant.

Further, the active participant automatic exposure setting system 304 can use weighted averaging of brightness levels associated with detected faces of current and past active participants to gradually adjust an exposure level based on an active participant. For example, the active participant automatic exposure setting system 304 can apply higher weights to brightness levels associated with a detected face in an image of a current active participant and lower weights to brightness levels of one or more past active participants. Further, the active participant automatic exposure setting system 304 can average the brightness levels across the detected faces according to the weights to gradually change an exposure level of a video feed. More specifically, as the active participant remains the active participant for longer, then one or more brightness levels at the active participant are weighted more heavily to adjust an exposure level based on weighted averaging. Subsequently, the exposure level is gradually aligned with one or more brightness levels at the active participant as brightness levels associated with face detections in images of past active participants are weighted less as the participant remains the active participant for longer.

The active participant automatic exposure setting system 304 can identify positions of active participants, e.g. in a session. More specifically, the active participant automatic exposure setting system 304 can identify positions of active participants for purposes of setting an exposure level in a captured video feed based on an active participant. For example, the active participant automatic exposure setting system 304 can associate an active participant with brightness levels at one or more face detections in an image based on one or more identified positions of the active participant. Specifically, the active participant automatic exposure setting system 304 can associate an active participant with one or more brightness levels associated with face detections based on one or more identified positions of the active participant and an identified position of the one or more face detections in a location. Subsequently, the active participant automatic exposure setting system 304 can use the one or more face detections associated with the active participant based on the one or more positions to set an exposure level of a video feed of a session including the active participant based on brightness levels at the active participant.

The active participant automatic exposure setting system 304 can identify a position of an active participant using either or both received audio input and a corresponding captured video feed. More specifically, the active participant automatic exposure setting system 304 can use direction and/or strength of received audio input of an active participant to identify a position of the active participant in a session. For example, the active participant automatic exposure setting system 304 can use strengths of audio signals received from a participant by multiple recorders in a videoconferencing session location to identify a position of the participant at the videoconferencing session location.

Further, the active participant automatic exposure setting system 304 can filter far end audio from local audio of captured audio input for use in identifying a position of a participant, e.g. in a session. More specifically, the active participant automatic exposure setting system 304 can separate local captured audio from far end audio in the time domain from received captured audio input of one or more participants in a session. Subsequently, the active participant automatic exposure setting system 304 can use only the local audio to identify a position of the participant in the session. This is advantageous, as far end audio can cause acoustical reflections that match false face detections, e.g. a reflection, of a participant. Subsequently, by filtering out far end audio, risks of false face detections being used to set exposure levels are reduced.

In utilizing positions of active speakers to set exposure levels, the active participant automatic exposure setting system 304 can filter identified face detections that do not correspond to active participant positions from face detections used to determine the exposure levels, e.g. a plurality of face detections to create a modified group of face detections. More specifically, if a face detection does not correspond to a position of an active participant in a session, then the active participant automatic exposure setting system 304 can refrain from using the face detection to calculate an exposure level of an active participant in the session. This can effectively remove false face detections from being used in calculating an exposure level for a session. Specifically, if a face detection is a false face detection, e.g. does not correspond to an active participant, then not using the face detection can reduce risks that an active participant are incorrectly exposed based on a false face detection. While this can exclude face detections that actually correspond to participants, this still can ensure that an active participant is used to set an exposure level.

The active participant automatic exposure setting system 304 can limit or otherwise determine a sampling size in a captured video feed for purposes of setting an exposure level in the captured video feed. More specifically, the active participant automatic exposure setting system 304 can identify a portion of a region around a face of a participant without actually identifying a face detection based on audio estimates for a position of the participant. For example, if audio estimates indicate a participant is at a specific position away from a camera in a videoconference session, then the active participant automatic exposure setting system 304 can select a portion of a captured video feed corresponding to the position of the participant, e.g. as indicated by audio input, without actually identifying a face detection of the participant. Subsequently, the active participant automatic exposure setting system 304 can use brightness levels in the portion of the captured video feed to set an exposure level of the captured video feed without actually using a face detection of the active participant.

Figure 4:
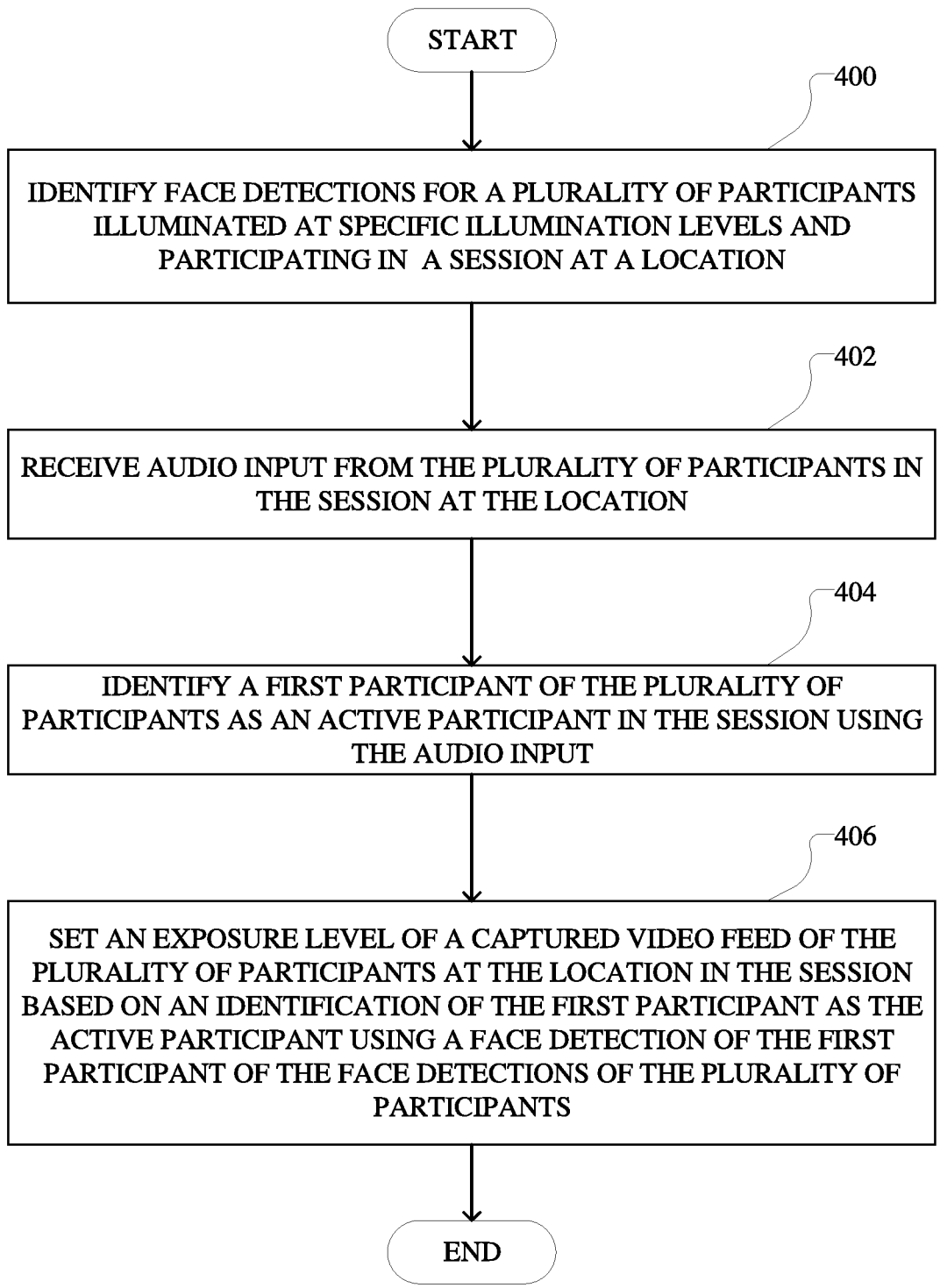
FIG. 4 illustrates a flowchart of an example method for setting an exposure level based on one or more illumination levels at an active participant.

FIG. 4 illustrates a flowchart of an example method for setting an exposure level based on one or more illumination levels at an active participant. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated.

Each module shown in FIG. 4 represents one or more steps, processes, methods or routines in the method. For the sake of clarity and explanation purposes, the modules in FIG. 4 are described with reference to the environment 300 shown in FIG. 3.

At step 400, the active participant automatic exposure setting system 304 identifies face detections of one or more participants in one or more images in a captured video feed of the one or more participants illuminated at one or more illumination levels at a location. Identified face detections of the one or more participants illuminated at one or more specific illumination levels can be associated with one or more brightness levels at the participants based on the one or more illumination levels of the one or more of participants at the location. For example, when the one or more participants include a plurality of participants, identified face detections of the one or more participants and associated brightness levels can include varying brightness levels across the participants based on varying illumination levels across the participants. Face detections of participants and associated brightness levels of the participants at a location can be identified from still images in a captured video feed at the location.

At step 402, the active participant automatic exposure setting system 304 can receive audio input from the one or more participants. Audio input can be synchronized with captured video and received as part of the captured video feed of the one or more participants at the location. The audio input can be filtered to exclude far field sound. This can further help to limit identification of false positions of the participants. For example, acoustical echoes in far field audio can distort position calculation of participants and filtering of far field audio from received audio input can subsequently help to ensure accurate position detection.

At step 404, the active participant automatic exposure setting system 304 can identify a first participant of the one or more participants as an active participant in the session using the audio input. For example, the active participant automatic exposure setting system 304 can identify a participant as an active participant in the session if they are the current speaker in the session, as indicated by the audio input. Additionally, a first participant of the participants can be identified as an active participant using both the audio input and a captured video feed of the participants at the location. For example, the active participant automatic exposure setting system 304 can use the audio input and facial movements in facial detections from a captured video feed of the participants to identify an active participant as a current speaker at the location.

At step 406, the active participant automatic exposure setting system 304 can set an exposure level of a captured video feed of the one or more participants at the location based on the first participant acting as the active participant. Specifically, the active participant automatic exposure setting system 304 can use one or more brightness levels in one more images used to identify a face detection of the first participant to set an exposure level of a captured video feed of the one or more participants at the location. As discussed previously, setting an exposure level in a captured video feed based on an active participant helps to ensure the active participant is correctly exposed. This is especially important when averaging methods, as opposed to weighted averaging methods, across participants are used to set an exposure level, and the participants are illuminated differently, thereby leading to incorrect exposure levels of an active participant.

Figure 5:
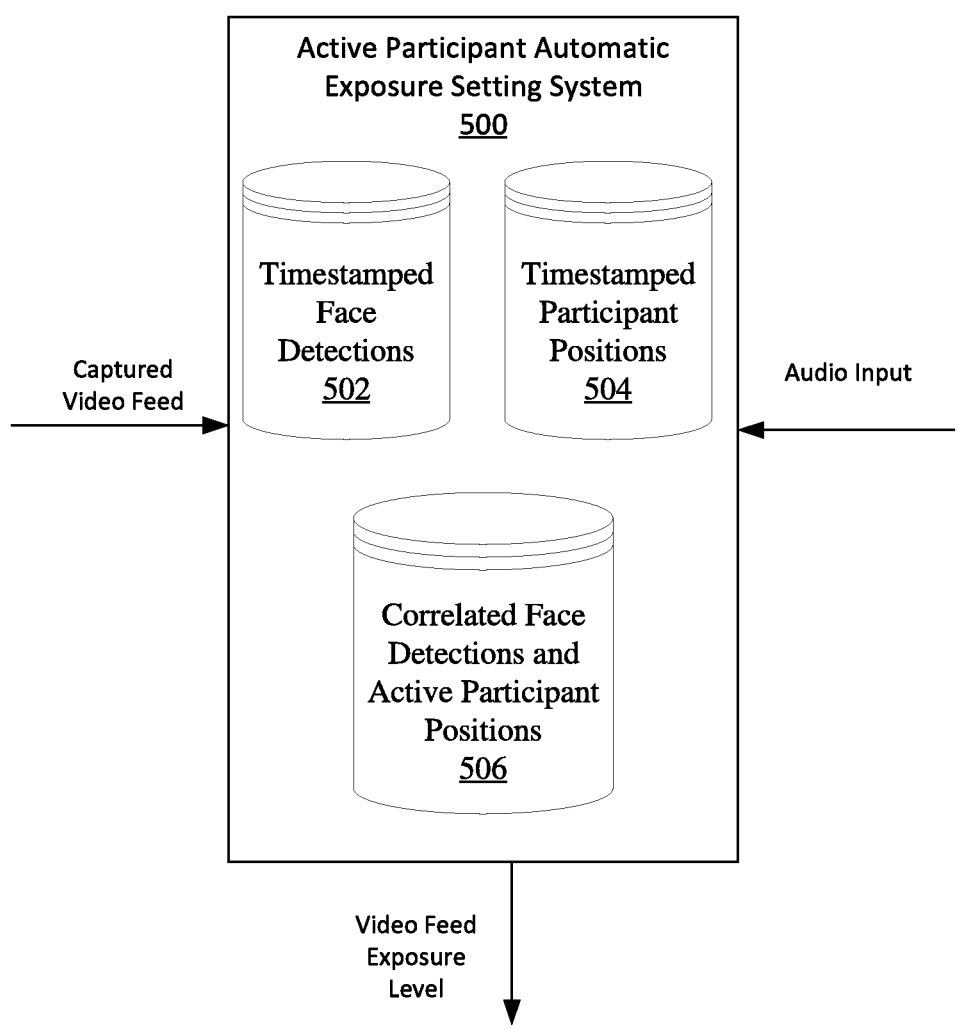
FIG. 5 illustrates an active participant automatic exposure setting system.

FIG. 5 illustrates an active participant automatic exposure setting system 500. The active participant automatic exposure setting system 500 can function according to an applicable system for setting an exposure level in a captured video feed based on an active participant, such as the active participant automatic exposure setting system 304 shown in FIG. 3. Specifically, the active participant automatic exposure setting system 500 can set an exposure level in a captured video feed at a location, e.g. in a session, based on brightness levels at an active participant at the location in the session.

The active participant automatic exposure setting system 500 can receive a captured video feed and audio input for a location. While the captured video feed and the audio input are shown as separate conceptual components in FIG. 5, in various embodiments, the audio input can be part of or otherwise synchronized with the captured video feed. The active participant automatic exposure setting system 500 can also provide data or instructions used to control an exposure level of a captured video feed at a location in a session. More specifically, the active participant automatic exposure setting system 500 can generate control instructions for controlling an exposure level in a captured video feed at a location in a session based on either or both audio input and a captured video feed for the location in the session.

The active participant automatic exposure setting system 500 can maintain timestamped brightness levels associated with face detections 502. Timestamped brightness levels include brightness levels associated with face detections in one or more images identified at a location in a videoconference session and timestamps for the face detections. Timestamps for brightness levels can include a time at which images and/or video used to identify and extract face detections associated with the brightness levels were created at a location in a videoconferencing session, e.g. in a captured video feed. For example, if a participant's face appears in an image at 12:32 in a captured video feed that is subsequently used to extract a face detection of the participant, then a brightness level associated with the face detection can be timestamped with information indicating a time of 12:32.

In maintaining the timestamped brightness levels associated with face detections 502, the active participant automatic exposure setting system 500 can identify/extract face detections of participants and subsequently or concurrently timestamp brightness levels associated with the face detections. Specifically, the active participant automatic exposure setting system 500 can identify faces and corresponding brightness levels included as part of face detections from a captured video feed at a location in a session. Additionally, the active participant automatic exposure setting system 500 can timestamp the brightness levels according to the time the brightness levels appeared in the captured video feed in order to create the timestamped brightness levels associated with face detections 502.

Additionally, the active participant automatic exposure setting system 500 can maintain timestamped participant positions 504. Timestamped participant positions include indications of participant positions at a location in a session and timestamps for the participant positions. Timestamps for participant positions can include a time at which a participant occupied a specific position at a location in a session. For example, a timestamped participant position can indicate that a participant was sitting in a specific chair in a videoconferencing session ten minutes into the videoconferencing session. The timestamped participant positions 504 can include active participant positions at a location in a session. For example, the timestamped participant positions 504 can include that an active speaker in a videoconference session sat at the front of a table in the beginning of the videoconference session.

In maintaining the timestamped participant positions 504, the active participant automatic exposure setting system 500 can identify positions of participants at a location. Specifically, the active participant automatic exposure setting system 500 can identify positions of participants at a location using either or both the audio input and the captured video feed. For example, the active participant automatic exposure setting system 500 can estimate a position of a participant based on signal strength of words spoken by the participant in the audio input. Additionally, in maintaining the timestamped participant positions 504, the active participant automatic exposure setting system 500 can timestamp identified participant positions. For example, if a participant is at a position at the start of a videoconferencing session, then the active participant automatic exposure setting system 500 can timestamp an indication of the position with an indication of the beginning of the session.

Further, in maintaining the timestamped participant positions 504, the active participant automatic exposure setting system 500 can identify a participant as an active participant and further identify a position of the active participant at a location. Specifically, the active participant automatic exposure setting system 500 can identify a participant as an active participant and identify a position of the participant when the participant acts as the active participant. Further, the active participant automatic exposure setting system 500 can timestamp the position of the participant acting as an active participant with an indication of a time when the participant was acting as the active participant at the position. Accordingly, the active participant automatic exposure setting system 500 can maintain a list of positions occupied by one or more active participants that is organized in a sequential order based on times that the positions were occupied by the one or more active participants. For example, the timestamped participant positions can include that a first active speaker occupied a first chair in a meeting and then a second active speaker became the active participant while occupying a second chair in the meeting.

The active participant automatic exposure setting system 500 can maintain correlated brightness levels and active participant positions 506. The correlated brightness levels and active participant positions 506 can be correlated by correlating a brightness level associated with a face detection of a specific participant acting as an active participant with a position of the specific participant. The active participant automatic exposure setting system 500 can correlate brightness levels with positions of active participants based on identified positions of active participants and positions of the face detections. Specifically, the active participant automatic exposure setting system 500 can identify a position of a brightness level associated with an identified face detection from a captured video feed and correlate the face detection to a position of an active participant if the position of the active participant is the position of the face detection. For example, if a participant is sitting at a specific location in a conference room and if the participant sitting at the location is identified as an active speaker, then the active participant automatic exposure setting system 500 can correlate a brightness level of a face detection of the speaker with the active speaker position.

Further, the active participant automatic exposure setting system 500 can correlate brightness levels of face detections in images of active participants with positions of the active participants based on time. Specifically, the active participant automatic exposure setting system 500 can correlate brightness levels at face detections in images of active participants with positions of the participants using the timestamped brightness levels 502 and the timestamped participant positions 504. More specifically, the active participant automatic exposure setting system 500 can correlate the brightness levels at face detections having a specific timestamp with an active participant position having the specific timestamp. For example, if an active speaker was speaking at the beginning of a meeting from a specific position then a brightness level in a face detection of the active speaker at the beginning of the meeting can be correlated with the specific position. In correlating brightness levels in face detections with active participant positions, the active participant automatic exposure setting system 500 can correlate audio with face detections. More specifically, the active participant automatic exposure setting system 500 can correlate audio corresponding to specific active speaker positions with a face detection, e.g. a face detection occurring at the specific active speaker position.

The correlated brightness levels and active participant positions 506 can be used by the active participant automatic exposure setting system 500 to set an exposure level of a captured video feed, e.g. in a session. Specifically, the active participant automatic exposure setting system 500 can identify a position of a participant acting as an active participant in a session, e.g. using the audio input. The active participant automatic exposure setting system 500 can then select a brightness level associated with a face detection for the participant by selecting a brightness level associated with a face detection correlated with or otherwise associated with the position of the participant using the correlated brightness levels and active participant positions 506. Subsequently, the active participant automatic exposure setting system 500 can use the brightness level to set an exposure level of a captured video feed in the session, e.g. based on brightness levels in the face detection.

The active participant automatic exposure setting system 500 can set an exposure level of a captured video feed based on a current active participant and a specific number of past active participants. For example, the active participant automatic exposure setting system 500 can average brightness levels associated with face detections of a current active participant and a specific number of past active participants to identify and subsequently set an exposure level for a captured video feed. A number of past active participants used with a current active participant to set an exposure level can be a threshold number of past active participants. For example, the active participant automatic exposure setting system 500 can average brightness levels at a current active speaker and the past five active speakers to control an exposure level in a captured video feed. Further, a number of past active participants used with a current active participant to set an exposure level can depend on whether the past active participants are still participants in a session. For example, the active participant automatic exposure setting system 500 can use brightness levels at a current active speakers and past active speakers still in attendance in a meeting to control an exposure level in a captured video feed.

In setting exposure levels based on current and past active participants, the active participant automatic exposure setting system 500 can use the correlated brightness levels and active participant positions 506. Specifically, the active participant automatic exposure setting system 500 can use the correlated brightness levels and active participant positions 506 to identify brightness levels associated with face detections for either or both current and past active past participants based on their positions. For example, the active participant automatic exposure setting system 500 can identify brightness levels associated with face detections of the past five active speakers by selecting the past five active speaker positions in the correlated brightness levels and active participant positions 506, e.g. using the timestamps. Subsequently, the active participant automatic exposure setting system 500 can set an exposure level based, at least in part, on the brightness levels associated with the face detections of either or both the current and past active past participants identified from the correlated brightness levels and active participant positions 506.

In using the correlated brightness levels and active participant positions 506 to set exposure levels based on positions of active participants, the active participant automatic exposure setting system 500 can refrain from using falsely identified face detections in calculating exposer levels. Specifically, as a position of an active participant, in various embodiments, does not correspond to a falsely identified face detection, and the active participant automatic exposure setting system 500 can select face detections to use in setting exposure levels based on positions of active participants, then the active participant automatic exposure setting system 500 refrain from using falsely identified face detections to set the exposure level. For example, a reflection of a participant in a mirror, e.g. a false face detection, is not a source of audio, e.g. an active participant position. Subsequently, the position of the reflection of the participant in the mirror is not a source of audio for an active participant and is therefore not identified as an active participant position. Accordingly, as the position of the reflection is not identified as an active participant position and as only active participant positions, in various embodiments, can be used to select a brightness level associated with the face detection for setting an exposure level, the reflection is not selected to set the exposure level.

Face detections and corresponding active participant positions can be associated with preset exposure levels. Specifically, face detections and associated brightness levels and corresponding active participant positions in the correlated brightness levels and active participant positions 506 can be associated with preset exposure levels. The preset exposure levels can vary across the face detections and corresponding active participant positions. For example, a first active participant location can be associated with a first preset exposure level that is different from a second preset exposure level associated with a second active participant location. A face detection with associated brightness level and corresponding active participant position can be associated with a preset exposure level selected based on the brightness levels associated with the face detection. For example, a preset exposure level for an active participant position can be set to correctly expose an active participant at the active participant position using a brightness level associated with a corresponding face detection of the active participant at the active participant position.

The active participant automatic exposure setting system 500 can set an exposure level of a captured video feed based on a selected preset exposure level. Specifically, the active participant automatic exposure setting system 500 can identify either or both past and current active participant positions in a session. More specifically, the active participant automatic exposure setting system 500 can identify one or more preset exposure levels associated with either or both the past and current active participant positions. Subsequently, the active participant automatic exposure setting system 500 can set an exposure level based on the one or more preset exposure levels, e.g. by setting the exposure level as one of the one or more present exposure levels or an average of the exposure levels.

A preset exposure level associated with a face detection and a corresponding active participant position can also be associated with a participant. Specifically, a participant who occupies an active participant position can be associated with a preset exposure level associated with the active participant position. Accordingly, when the participant who occupies the active participant position is actually identified as the current active participant in a videoconferencing session, the exposure level in the session can be quickly set based on the preset exposure level. This allows for easier switching of the exposure level as the active participant in the videoconferencing session changes corresponding to changes in the active participant position in the session. In setting an exposure level based on a preset exposure level, the active participant automatic exposure setting system 500 can gradually adjust an exposure level over time based on the preset exposure level. More specifically, the active participant automatic exposure setting system 500 can gradually adjust an exposure level until a preset exposure level is achieved.

Figure 6:
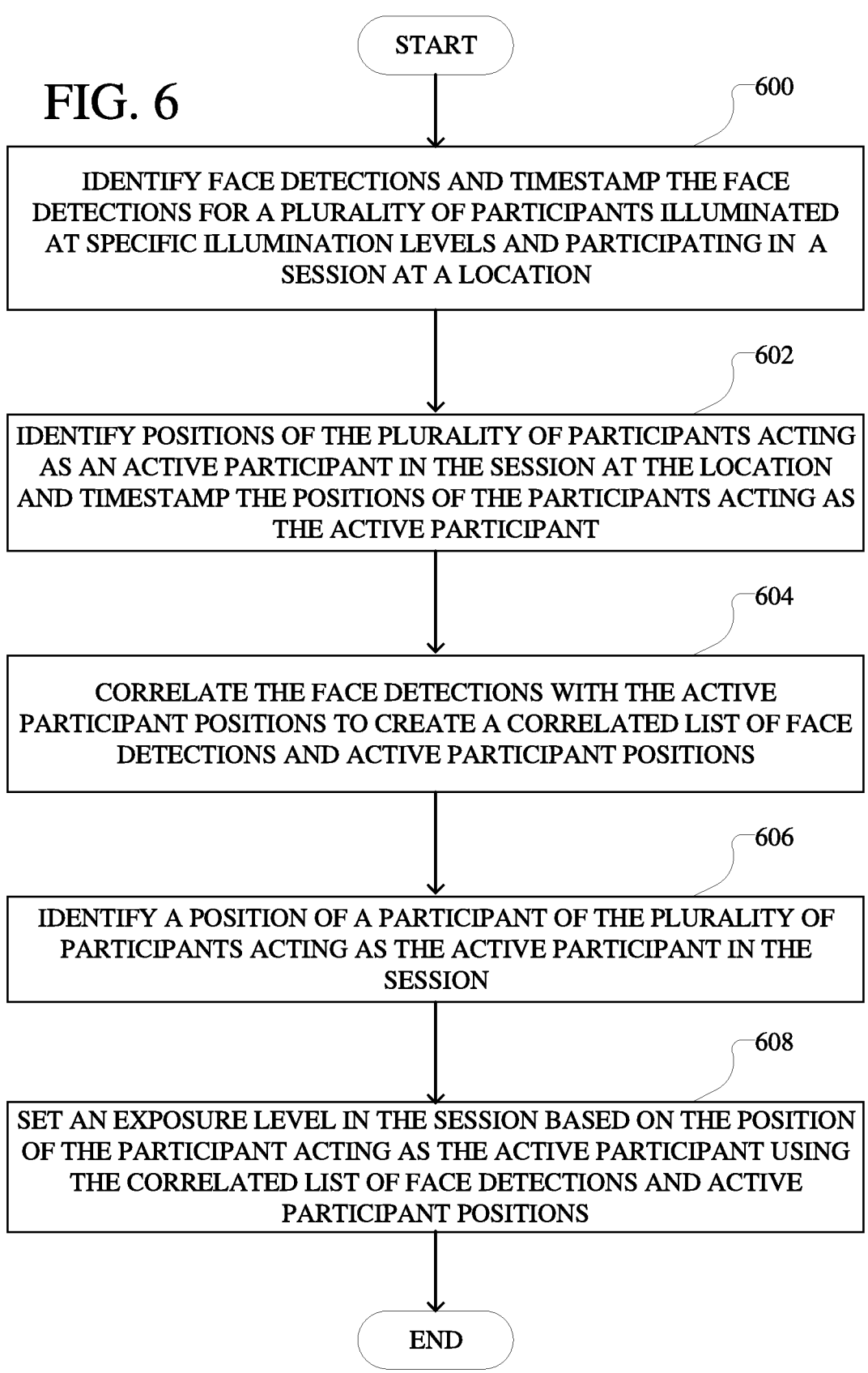
FIG. 6 illustrates a flowchart of an example method of using correlated brightness levels associated with face detections and participant positions to set an exposure level of a captured video feed based on an active participant.

FIG. 6 illustrates a flowchart of an example method of using correlated brightness levels associated with face detections and participant positions to set an exposure level of a captured video feed based on an active participant. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated.

Each module shown in FIG. 6 represents one or more steps, processes, methods or routines in the method. For the sake of clarity and explanation purposes, the modules in FIG. 6 are described with reference to the active participant automatic exposure setting system 500 shown in FIG. 5.

At step 600, the active participant automatic exposure setting system 500 can identify and timestamps brightness levels associated with face detections for one or more participants illuminated at specific illumination levels and participating in a session at a location. The active participant automatic exposure setting system 500 can identify face detections and associated brightness levels from a captured video feed at the location. Additionally, as part of identifying and timestamping brightness levels and associated face detections for the one or more participants, the active participant automatic exposure setting system 500 can also identify face detections that are false face detections for the one or more participants. For example, the active participant automatic exposure setting system 500 can identify reflections of the one or more participants as face detections.

At step 602, the active participant automatic exposure setting system 500 can identify positions of the one or more participants acting as an active participant in the session at the location. Further, the active participant automatic exposure setting system 500 can timestamp the positions of the one or more participants acting as the active participant in the session at the location. The active participant automatic exposure setting system 500 can identify positions of the one or more participants acting as an active participant using either or both a captured video feed and audio input at the location in the session. For example, the active participant automatic exposure setting system 500 can use audio input to identify that a participant is acting as an active participant in the session and subsequently use the audio input to identify a positions of the participant acting as the active speaker.

At step 604, the active participant automatic exposure setting system 500 can correlate the brightness levels and associated face detections with the active participant positions to create a correlated list of brightness levels and active participant positions. Specifically, the active participant automatic exposure setting system 500 can correlate the brightness levels and the active participant positions based on the timestamps of the brightness levels and the active participant positions. For example, the active participant automatic exposure setting system 500 can associate a brightness level with an active participant position if they have the same timestamp. Additionally, the active participant automatic exposure setting system 500 can correlate the brightness levels with the active participant positions based on positions of the face detections and the active participant positions. For example, if an associated brightness level with a face detection is identified at a specific active participant position, then the active participant automatic exposure setting system 500 can correlate the brightness level with the active participant position.

At step 606, the active participant automatic exposure setting system 500 can identify a position of a participant of the one or more participants acting as the active participant in the session. The active participant automatic exposure setting system 500 can identify a position of a participant acting as the active participant using either or both a captured video feed and audio input for the session. For example, the active participant automatic exposure setting system 500 can identify a position of the participant based on signals of audio spoken by the participant acting as the active participant and received at a microphone array at the location in the session. More specifically, the automatic exposure setting system 500 can identify a position of the participant based on delays between channels of audio received at the microphone array to identify a position of the participant. The active participant automatic exposure setting system 500 can filter far end audio from the audio input and use the resultant filtered audio input to identify a position of a participant acting as the active participant. Specifically, the active participant automatic exposure setting system 500 can filter echoes from spoken audio input from the participant to ensure that the echoes are not used in actually identifying a position of the participant.

At step 608, the active participant automatic exposure setting system 500 can set an exposure level in a captured video feed of the session based on the position of the participant acting as the active participant using the correlated list of brightness levels and active participant positions. Specifically, the correlated list of brightness levels and active participant positions can include a brightness level associated with a face detection of the participant correlated with the position of the participant acting as the active speaker. Subsequently, the active participant automatic exposure setting system 500 can set the exposure level based on brightness levels in the face detection of the participant selected from the correlated list of face detections and active participant positions. Additionally, the active participant automatic exposure setting system 500 can set the exposure level based on the participant acting as the current active participant and other participants that acted as past active participants using the correlated list of face detections and active participant positions. For example, the active participant automatic exposure setting system 500 can use a face detection of the participant currently acting as the active participant and face detections of past participants acting as the active participant to set the exposure level of the captured video feed of the session.

The disclosure now turns to FIGS. 7 and 8, which illustrate example network devices and computing devices, such as switches, routers, load balancers, client devices, and so forth.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   detecting one or more faces of one or more participants in one or more images in a captured video feed created by a camera at a location of the one or more participants illuminated at one or more illumination levels at the location, the one or more detected faces in the one or more images associated with one or more brightness levels of the one or more participants in the one or more images caused by the one or more illumination levels at the location;
   receiving audio input from the one or more participants at the location;
   timestamping brightness levels associated with one or more face detections of the one or more participants in the one or more images to create a list of timestamped brightness levels associated with the one or more face detections in the one or more images;
   identifying, based on the received audio input and/or captured video feed, positions of participants of the one or more participants acting as an active participant at the location;
   timestamping the positions of the one or more participants acting as the active participant at the location to create a list of timestamped active participant positions;
   correlating the list of the timestamped brightness levels associated with face detections in the one or more images with the list of the timestamped active participant positions to create a correlated list of brightness levels and active participant positions;
   identifying a position of a first participant in acting as the active participant at the location; and
   setting exposure level of the captured video feed based on the position of the first participant acting as the active participant at the location using the correlated list of brightness levels and active participant positions.

2. The method of claim 1, wherein the exposure level in the captured video feed is gradually adjusted over time based on the brightness level in the one or more images associated with the face detection of the first participant.

3. The method of claim 1, further comprising:
   identifying the position of the first participant at the location from the audio input; and
   identifying the brightness level associated with the face detection of the first participant in the one or more images based on the position of the first participant identified from the audio input.

4. The method of claim 1, further comprising:
   identifying a second participant of the one or more participants has switched to the active participant using the audio input; and
   adjusting the exposure level of the captured video feed based on a second brightness level in the one or more images associated with a face detection of the second participant in the one or more images.

5. The method of claim 4, wherein the exposure level of the captured video feed is adjusted gradually over time based on the second brightness level associated with the face detection of the second participant in the one or more images.

6. The method of claim 5, wherein the exposure level of the capture video feed is gradually adjusted using a sliding window of a buffer of a plurality of brightness levels associated with face detections of the one or more participants in the one or more images including the face detection of the first participant and the face detection of the second participant in the one or more images.

7. The method of claim 4, wherein the exposure level of the captured video feed is gradually adjusted using weighted averaging of brightness levels associated with a plurality of face detections of the one or more participants in the one or more images including the face detection of the first participant and the face detection of the second participant in the one or more images.

8. The method of claim 1, wherein timestamped brightness levels in the list of timestamped brightness levels associated with the one or more face detections in the one or more images and timestamped active participant positions in the list of timestamped active participant positions are correlated based on times indicated by timestamps of the timestamped brightness levels and timestamps of the timestamped active participant positions to correlate the one or more brightness levels associated with the one or more face detections in the one or more images with the one or more participants based on the positions of the one or more participants acting as the active participant at the location.

9. The method of claim 1, further comprising:
   identifying the brightness level in the one or more images associated with the face detection of the first participant in the one or more images using the correlated list of brightness levels and active participant positions; and setting the exposure level of the captured video feed using the brightness level in the one or more images associated with the face detection of the first participant in the one or more images selected using the correlated list of brightness levels and active participant positions.

10. The method of claim 8, wherein the audio input is used to identify the positions of the participants acting as the active participant at the location.

11. The method of claim 1, wherein the audio input is filtered to include local audio and exclude far end audio occurring at the location.

12. The method of claim 1, further comprising:
identifying a plurality of face detections in the one or more images in the captured video feed at the location;
excluding a face detection in the one or more images of the plurality of face detections in the one or more images that fails to correspond to a position of a participant of the one or more participants acting as the active participant at the location to create a modified group of face detections in the one or more images; and
setting the exposure level of the captured video feed using the modified group of face detections in the one or more images.

13. The method of claim 12, wherein the modified group of face detections in the one or more images includes the face detection of the first participant in the one or more images and the face detection of the first participant in the one or more images is used from the modified group of face detections in the one or more images to set the exposure level of the captured video feed.

14. A system comprising:
one or more processors; and
at least one computer-readable storage medium having stored therein instructions which, when executed by the one or more processors, cause the one or more processors to:
capture a video feed at a location, the video feed including images of one or more participants illuminated at one or more illumination levels at the location, the images associated with one or more brightness levels caused by the one or more illumination levels at the location;
receive audio input from the one or more participants at the location;
timestamping brightness levels associated with one or more face detections of the one or more participants in the one or more images to create a list of timestamped brightness levels associated with the one or more face detections in the one or more images;
identifying, based on the received audio input and/or captured video feed, positions of participants of the one or more participants acting as an active participant at the location;
timestamping the positions of the one or more participants acting as the active participant at the location to create a list of timestamped active participant positions;
correlating the list of the timestamped brightness levels associated with face detections in the one or more images with the list of the timestamped active participant positions to create a correlated list of brightness levels and active participant positions;
identifying a position of a first participant in acting as the active participant at the location; and setting exposure level of the captured video feed based on the position of the first participant acting as the active participant at the location using the correlated list of brightness levels and active participant positions.

15. The system of claim 14, wherein the instructions which, when executed by the one or more processors, further cause the one or more processors to perform operations to:
identify the position of the first participant at the location from the audio input; and
identify the brightness level associated with the face detection of the first participant in the one or more images based on the position of the first participant identified from the audio input.

16. The system of claim 14, wherein the instructions which, when executed by the one or more processors, further cause the one or more processors to perform operations to:
identify a second participant of the one or more participants has switched to the active participant using the audio input; and
adjust the exposure level of the captured video feed based on a second brightness level in the one or more images associated with a face detection of the second participant in the one or more images.

17. The system of claim 14, wherein the instructions which, when executed by the one or more processors, further cause the one or more processors to perform operations to:
identify the brightness level in the one or more images associated with the face detection of the first participant in the one or more images using the correlated list of brightness levels and active participant positions; and
set the exposure level of the captured video feed using the brightness level in the one or more images associated with the face detection of the first participant in the one or more images selected using the correlated list of brightness levels and active participant positions.

18. A non-transitory computer-readable storage medium comprising instructions stored therein which, when executed by a processor, cause the processor to:
detect one or more faces of one or more participants in one or more images in a captured video feed created by a camera at a location of the one or more participants illuminated at one or more illumination levels at the location, the one or more detected faces in the one or more images associated with one or more brightness levels of the one or more participants in the one or more images caused by the one or more illumination levels at the location;
receive audio input from the one or more participants at the location;
timestamping brightness levels associated with one or more face detections of the one or more participants in the one or more images to create a list of timestamped brightness levels associated with the one or more face detections in the one or more images;
identifying, based on the received audio input and/or captured video feed, positions of participants of the one or more participants acting as an active participant at the location;
timestamping the positions of the one or more participants acting as the active participant at the location to create a list of timestamped active participant positions;
correlating the list of the timestamped brightness levels associated with face detections in the one or more images with the list of the timestamped active participant positions to create a correlated list of brightness levels and active participant positions;

identifying a position of a first participant in acting as the active participant at the location; and setting exposure level of the captured video feed based on the position of the first participant acting as the active participant at the location using the correlated list of brightness levels and active participant positions.

* * * * *